C. CAPUANO.
MEASURING DEVICE.
APPLICATION FILED FEB. 5, 1920.
1,433,496.
Patented Oct. 24, 1922.
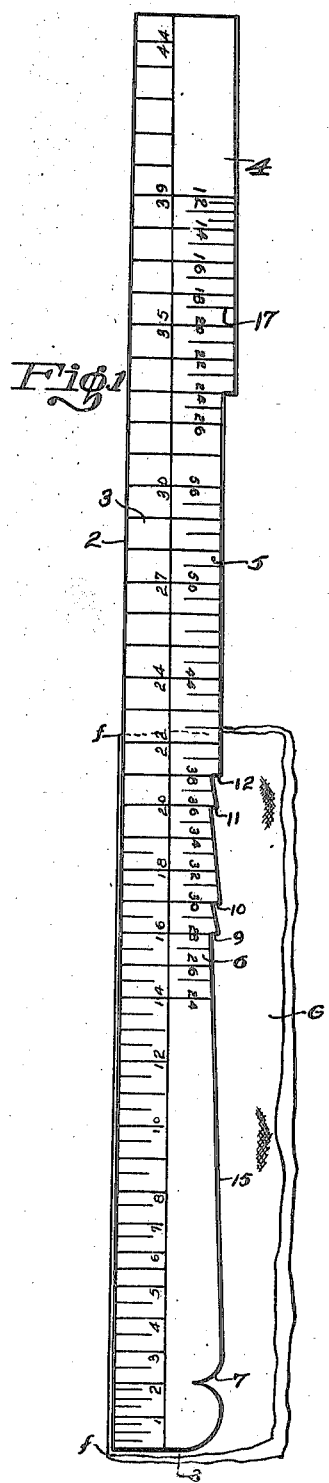
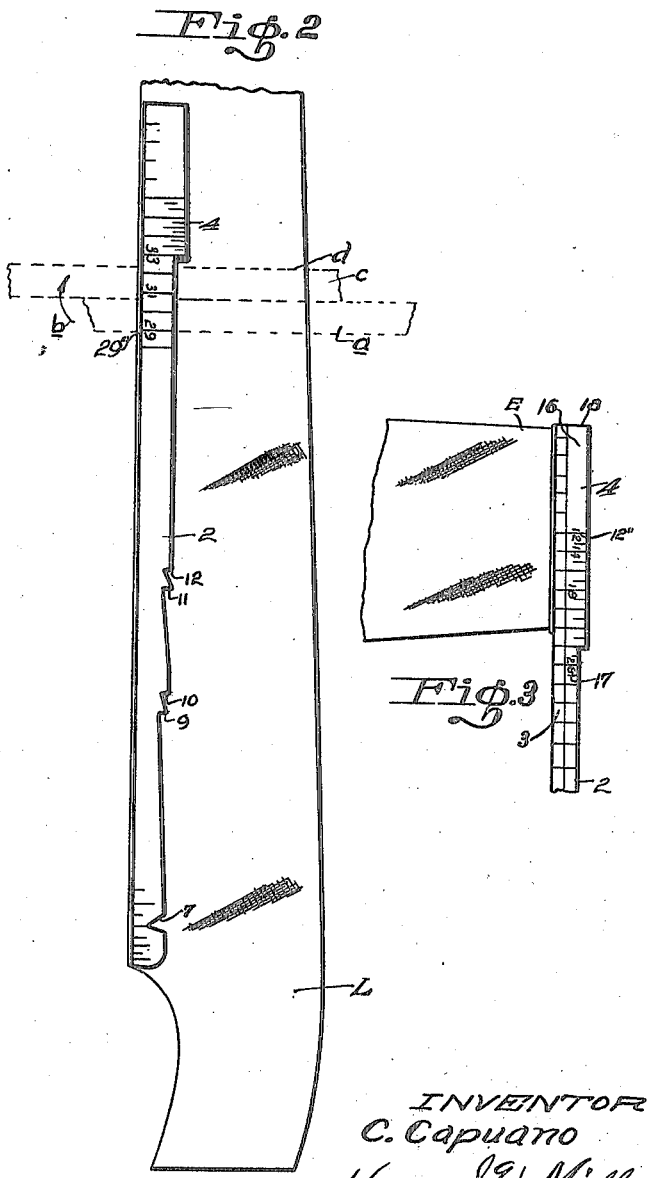
INVENTOR
C. Capuano
By Hazard & Miller
Att'ys Patented Oct. 24, 1922.

1,433,496

UNITED STATES PATENT OFFICE.

CRESCENZO CAPUANO, OF LOS ANGELES, CALIFORNIA.

MEASURING DEVICE.

Application filed February 5, 1920. Serial No. 356,465.

*To all whom it may concern:*

Be it known that I, CRESCENZO CAPUANO, a citizen of Italy, residing at Los Angeles, in the county of Los Angeles and State of California, have invented new and useful Improvements in Measuring Devices, of which the following is a specification.

This invention relates to measuring devices and more particularly to tailors' rules, and has for its object to provide an improved rule for facilitating the taking of various measurements common in cutting and measuring clothes and more particularly trousers, and the invention consists of the construction and details an embodiment of which is illustrated in the accompanying drawings and described and claimed herein.

Figure 1 is a plan view of the scale as adapted for the use of measuring waistbands.

Fig. 2 shows the use of the instrument in the measuring of the length of the legs of a pair of trousers and for adding the additional length to provide cuffs thereto.

Fig. 3 is a plan view of the device in the use of measuring the length of the lower end of a pair of trousers.

In Fig. 1 the improved rule is indicated at 2 and has along one edge the standard English scale of measurement, this scale designated at 3. One end of the scale is made along its length for a suitable distance of a predetermined width, this section of the scale being indicated at 4 and the width is preferably about one and eleven sixteenths ($1\frac{11}{16}$) of an inch, so that when it is desired to mark cuffs on the bottom ends of the legs of trousers the cuffs to be an inch and three quarters ($1\frac{3}{4}$) deep it is only necessary to apply the rule shown in Fig. 2 so that measuring from the crotch of the leg pattern L toward the foot end of the leg such a length as may be desired or given and for instance to the "29" inch mark, this will enable the cutter to then readily turn the body of the rule transversely across the leg of the trouser as shown by the dotted lines $a$ with one edge of the rule at the "29" inch mark, which he has just previously made on the goods, and then to run the chalk across the opposite parallel edges of the section 4 of the rule, the result being to mark a space between the chalk lines that will be substantially one and three quarters ($1\frac{3}{4}$) of an inch wide, the difference between the one and eleven sixteenths ($1\frac{11}{16}$) width of the section 4 being produced by the added space of the chalk line as the latter is drawn along the edge of the rule.

Having made the first mark at the position $a$ the cutter then merely revolves the rule on one longitudinal edge as indicated by the arrow $b$ to the position shown at $c$ and then again scribes a mark along the other edge of the rule producing the mark $d$. There may be left extending beyond this mark $d$ the usual "outlet" for trimming and pleating the lowermost edge of the trousers.

Just beyond the section 4 of the rule there is a further section 5 having parallel edges that are spaced about one and seven sixteenths ($1\frac{7}{16}$) of an inch, and this portion 5 of the body of the rule may also be utilized as a gauge, in the manner above described with respect to the use of the section 4, when it is desired to make a cuff on the end of the leg of a pair of trousers, the cuff to be one and half ($1\frac{1}{2}$) inches deep.

A further and important feature of the invention resides in means for facilitating the cutting of waistbands, and in the illustrated embodiment such means comprises the arrangement of a supplemental scale designated at 6, this scale including the numbers "24" to "56" inclusive, this scale being arranged intermediate the length of the rule 2 and its unit of subdivisions being one-half of the standard unit one inch in the scale 3; and the scale 6 is shown as having its indices in registration with the indices of the scale 3. In this case the index or transverse mark "24" is shown as co-ordinate to the index mark "14" of the scale 3, and this mark is therefore fourteen inches from the unit section "1" at one end of the scale 3.

At the unit index mark "2" of the scale 3 there is shown a notch 7 this notch therefore being two inches from the transverse end 8 of the scale and twelve inches from the index "24" of the scale 6, and the edge of the rule having the notch 7 is shown as provided with a series of notches 9 at the index "28"; 10 at the index "30"; 11 at the index "36" and 12 at the index "38"; these notches being so placed as to enable the tailor to readily place a chalk mark at one of these lines according to the length of a waistband to be cut as for instance from the goods G, Fig. 1, of which a waist band is to be made.

The goods G may consist of one piece folded along the line $f$, if the piece is of sufficient width, or if two pieces of goods are used they are laid face to face with straight edges in alinement as at *f*, if they have straight edges, or if the edges are not straight the rule 2 is placed upon the goods at such position intermediately the transverse edges as will enable the tailor to scribe a straight line at the straight edge of the rule, as along the edge of the scale portion 3, and then to chalk off in the scale 6 the point co-ordinate therein to a given length of waistband to be made, as for instance at the "28" inch notch.

It will be seen then that since the goods is two ply the total length of the two pieces will be sufficient to form a complete waistband and one of the pieces may be cut off at the notch mark 7 so that one piece will be fully two inches longer than the other.

The tailor having placed a chalk mark at 28 for instance then has but to draw a straight line, in this adjustment of the rule, along the edge 15 from the notch 7 to the notch 9. But in the event that the tailor wishes to make a check mark at one of the notches 10, 11 or 12 he then simply turns the rule over edge for edge so as to obtain a straight line guide along which to run the chalk, as from the position of the notch 7 to the notch 11.

In Fig. 3 the rule is shown as applied to one end of a leg of a pair of trousers with an end section 16 applied thereto, this end section being provided with a scale 17 starting with an index numeral "12," and subdivided into units reading up to "26," these units being one-half of the length of the standard English one inch unit in the scale 3, and the scale 17 is therefore arranged so as to start at a point six inches from the end 18 of the scale; and from this it will be seen that when the rule is applied to one leg end of the trousers with the end 18 of the scale contiguous to an edge of the trouser leg at E, the full circumference of the trouser will readily be indicated by the mark with which the opposite edge of the trouser will coincide when the rule is laid flatwise on to the folded trouser leg; in this case the indication fifteen inches of circumference.

From the above it will be seen that I have provided a unitary combined scale with a set of complementary scaled sections arranged to facilitate the measurement for length of a trouser leg and the further measurement for the addition of the material from which to form cuffs on the trouser legs, this latter being accomplished by the use of the width of the rule as a gauge and eliminating the requirement of mental calculation as to the width of the additional material; further I have provided for the cutting of the waistband pieces with a minimum of mental calculation and with rapidity of operation and accuracy of production; and have also provided for the rapid measurement of the leg ends to determine their length of circumference.

Various changes may be made without departing from the spirit of my invention as claimed.

I claim:

1. A portable tailor's rule having a straight edge and having its opposite edge notched at given positions with respect to one end for facilitating the marking off of waistbands of trousers, the notched edge having a scale with its units one-half of an inch in length.

2. A tailor's rule having a straight edge and having its opposite edge notched at given positions with respect to one end for facilitating the marking off of waistbands of trousers, the notched edge having a scale with its units one-half of an inch in length, and said scale starting an arbitrary distance from one end of the rule.

3. A tailor's rule having a straight edge and having its opposite edge notched at given positions with respect to one end for facilitating the marking off of waistbands of trousers, the notched edge having a scale with its units one-half of an inch in length, and a "cut-off" index between one end of the rule and the initial scale marking of said scale.

4. A tailor's rule having a straight edge and having its opposite edge notched at given positions with respect to one end for facilitating the marking off of waistbands of trousers, the notched edge having a scale with its units one-half of an inch in length, and a "cut-off" index between one end of the rule and the initial scale marking of said scale, the edge of the rule between the "cut-off" index and the first notch of the scale being substantially straight for marking purposes therebetween.

5. A tailor's rule having a straight-edge and a scale on one face of the rule adjacent said edge, an end section constituting a continuation of the rule and having that edge opposed to the straight edge of the rule provided with a scale, said section being relatively wide as compared to the remainder of the rule to clearly define the section, notches formed in that edge of the rule opposite to the straight edge, said notches being arranged in spaced groups, a notch adjacent that end of the rule remote from the end section, and a scale along the notched edge of the rule and having the units thereof of a different length with respect to the units of the first scale.

In testimony whereof I have signed my name to this specification.

CRESCENZO CAPUANO.